United States Patent
Horigome

(10) Patent No.: US 11,830,254 B2
(45) Date of Patent: Nov. 28, 2023

(54) OUTSIDE ENVIRONMENT RECOGNITION DEVICE

(71) Applicant: Mazda Motor Corporation, Hiroshima (JP)

(72) Inventor: Daisuke Horigome, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 27 days.

(21) Appl. No.: 17/618,504

(22) PCT Filed: Mar. 16, 2020

(86) PCT No.: PCT/JP2020/011537
§ 371 (c)(1),
(2) Date: Dec. 13, 2021

(87) PCT Pub. No.: WO2020/250527
PCT Pub. Date: Dec. 17, 2020

(65) Prior Publication Data
US 2022/0237922 A1 Jul. 28, 2022

(30) Foreign Application Priority Data
Jun. 14, 2019 (JP) ................... 2019-111071

(51) Int. Cl.
*G06V 20/58* (2022.01)
*G06V 20/70* (2022.01)
(Continued)

(52) U.S. Cl.
CPC .............. *G06V 20/58* (2022.01); *B60R 11/04* (2013.01); *G06V 20/38* (2022.01); *G06V 20/588* (2022.01); *G06V 20/70* (2022.01)

(58) Field of Classification Search
CPC ........ G06V 20/38; G06V 20/58; G06V 20/70; G06V 20/588; B60R 11/04
See application file for complete search history.

(56) References Cited

U.S. PATENT DOCUMENTS

2005/0228580 A1    10/2005   Winner et al.
2013/0173208 A1*   7/2013    Kuzunishi ................ G01B 5/28
                                                                  73/104
(Continued)

FOREIGN PATENT DOCUMENTS

CN     103185724 A      7/2013
DE     102009024131 A1  1/2010
(Continued)

OTHER PUBLICATIONS

International Search Report and Written Opinion dated Jun. 9, 2020, received for PCT Application PCT/JP2020/011537, Filed on Mar. 16, 2020, 9 pages including English Translation.

*Primary Examiner* — Howard D Brown, Jr.
(74) *Attorney, Agent, or Firm* — XSENSUS LLP

(57) ABSTRACT

A recognition processor performs recognition processing to recognize an external environment of a mobile object, based on image data acquired by an imaging unit that takes an image of an external environment of the mobile object. The recognition processor includes a plurality of arithmetic cores. The plurality of arithmetic cores include a recognition processing core that performs the recognition processing, and an abnormality detection core that detects an abnormality of a data processing system including the imaging unit and the recognition processor, based on the abnormality of the output from the recognition processing core.

2 Claims, 10 Drawing Sheets

(51) Int. Cl.
    *G06V 20/00*           (2022.01)
    *G06V 20/56*           (2022.01)
    *B60R 11/04*           (2006.01)

(56) References Cited

U.S. PATENT DOCUMENTS

| | | |
|---|---|---|
| 2017/0244954 A1* | 8/2017 | Nagasaki ............ H04N 13/239 |
| 2018/0215392 A1 | 8/2018 | Kosaka et al. |
| 2018/0322001 A1 | 11/2018 | Armbruster et al. |
| 2019/0156131 A1 | 5/2019 | Akiyama et al. |

FOREIGN PATENT DOCUMENTS

| | | | |
|---|---|---|---|
| EP | 3223195 | A1 | 9/2017 |
| EP | 3416100 | A2 | 12/2018 |
| EP | 3493152 | A1 | 6/2019 |
| JP | 2006-285699 | A | 10/2006 |
| JP | 2006285699 | A * | 10/2006 |
| JP | 2013-140448 | A | 7/2013 |
| JP | 2018-22234 | A | 2/2018 |
| JP | 2018-124864 | A | 8/2018 |
| JP | 2019-500682 | A | 1/2019 |

\* cited by examiner

OUTSIDE ENVIRONMENT RECOGNITION DEVICE

CROSS-REFERENCE TO RELATED APPLICATIONS

The present application is based on PCT filing PCT/JP2020/011537, filed Mar. 16, 2020 and claims priority to Japanese Application No. 2019-111071, filed Jun. 14, 2019, the entire contents of each are incorporated herein by reference.

TECHNICAL FIELD

The technology disclosed herein relates to an external environment recognition device that recognizes an external environment of a mobile object.

BACKGROUND ART

Patent Document 1 discloses an image processing apparatus to be mounted in a vehicle. The image processing apparatus includes: a road surface detector that detects a road surface area from an input image based on an image taken by a camera; a time-series verifier that performs a time-series verification of a detection result of the road surface area in the input image; a sensing area selector that sets a sensing area for sensing an object in the input image, based on the detection result of the road surface area from the road surface detector and a result of the time-series verification from the time-series verifier; and a sensor that senses the object in the sensing area.

CITATION LIST

Patent Document

PATENT DOCUMENT 1: Japanese Unexamined Patent Publication No. 2018-22234

SUMMARY OF THE INVENTION

Technical Problem

Such an apparatus disclosed in Patent Document 1 is provided with a data processing system targeted for abnormality detection, which may be provided with redundancy in order to detect an abnormality thereof. Specifically, a system (so-called dual lockstep system) may be employed. The system is provided with two processing units that perform the same data processing. The same data is input to the two processing units to compare outputs from the two processing units. If the outputs are different from each other, it is determined that the data processing has an abnormality. However, the data processing system provided with redundancy includes a redundant configuration, resulting in an increase in circuit size and a power consumption of the data processing system.

In view of the foregoing background, it is therefore an object of the present disclosure to provide an external environment recognition device capable of reducing the increase in circuit size and power consumption due to addition of an abnormality detection function.

Solution to the Problems

The technology disclosed herein relates to an external environment recognition device that recognizes an external environment of a mobile object. The external environment recognition device includes a recognition processor that performs recognition processing to recognize an external environment of the mobile object, based on image data acquired by an imaging unit that takes an image of the external environment of the mobile object. The recognition processor includes a plurality of arithmetic cores. The plurality of arithmetic cores include a recognition processing core that performs the recognition processing, and an abnormality detection core that detects an abnormality of a data processing system including the imaging unit and the recognition processor, based on an abnormality of an output from the recognition processing core.

This configuration allows the abnormality of the data processing system targeted for abnormality detection to be detected without providing the entire data processing system with redundancy. This reduces the increase in circuit size and power consumption due to addition of an abnormality detection function compared with the case in which the entire data processing system targeted for abnormality detection is provided with redundancy.

The abnormality of the output from the recognition processing core may be an abnormality of a movable area included in the external environment of the mobile object represented in the output from the recognition processing core.

With this configuration, the abnormality detection core detects the abnormality of the data processing system, based on the abnormality of the movable area (i.e., the movable area recognized by the recognition processing) represented in the output from the recognition processing core. In the image (image data) representing the external environment of the mobile object, an area of a pixel region representing the movable area (e.g., the roadway) tends to be greater than that of the pixel region representing the target (e.g., the vehicle). Thus, in the recognition processing, the movable area is easier to be recognized than the targets. The detection of the abnormality of the data processing system, based on the abnormality of the movable area represented in the output from the recognition processing core allows improvement in accuracy of detecting the abnormality of the data processing system.

The abnormality of the output from the recognition processing core may be an abnormality of a temporal change in the output from the recognition processing core.

With this configuration, the abnormality detection core detects the abnormality of the data processing system, based on the abnormality of the temporal change in the output from the recognition processing core. In this manner, the detection based on the abnormality of the temporal change in the output from the recognition processing core allows detection of an abnormality undetectable from the output acquired at a single time point from the recognition processing core. This enables improvement in accuracy of the abnormality detection for the data processing system.

The abnormality detection core may be configured to detect the abnormality of the data processing system, based on the duration of the abnormality of the output from the recognition processing core.

With this configuration, the detection based on the duration of the abnormality of the output from the recognition processing core allows reduction in excessive detection of the abnormality of the data processing system. This enables an appropriate detection of the abnormality of the data processing system.

Advantages of the Invention

The technology disclosed herein enables reduction of the increase in circuit size and power consumption due to addition of an abnormality detection function.

DESCRIPTION OF EMBODIMENT

Figure 1:
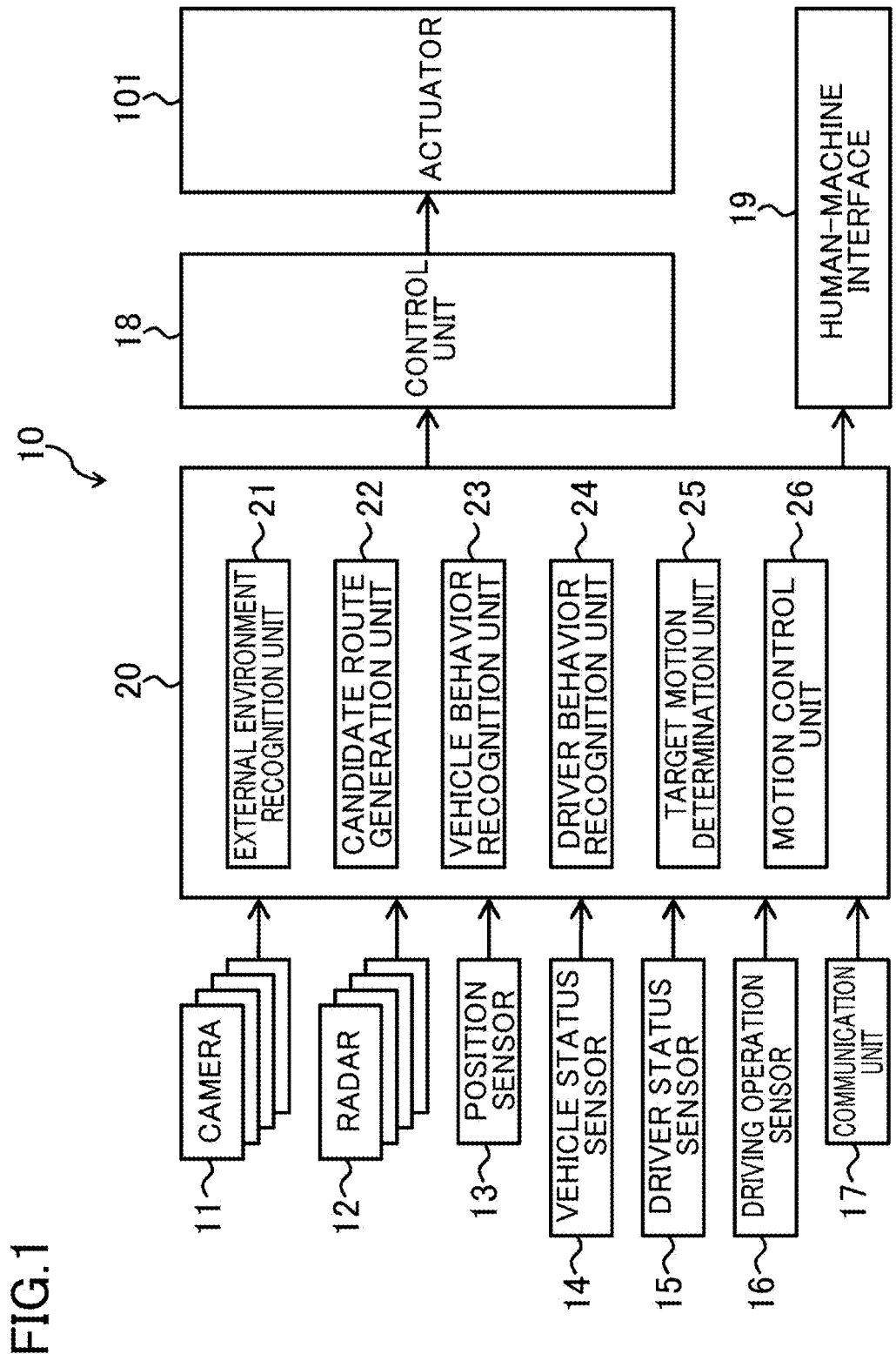
FIG. 1 is a block diagram illustrating a configuration of a mobile object control system according to an embodiment.

An embodiment will be described in detail below with reference to the drawings. Note that the same or corresponding parts are denoted by the same reference characters in the drawings, and the description thereof will not be repeated. A vehicle control system 10 will be described below as an example mobile object control system that controls an operation of a mobile object.

Embodiment

FIG. 1 illustrates a configuration of the vehicle control system 10. The vehicle control system 10 is provided for a vehicle (four-wheeled vehicle in this example) that is an example mobile object. The vehicle can switch among manual driving, assisted driving, and self-driving. In the manual driving, the vehicle travels in accordance with the operations by the driver (e.g., the operations of an accelerator or other elements). In assisted driving, the vehicle travels in accordance with the assistance of the driver's operations. In the self-driving, the vehicle travels without the driver's operations. In the self-driving and assisted driving, the vehicle control system 10 controls an actuator 101 provided for the vehicle to control the operation of the vehicle. The actuator 101 includes the engine, the transmission, the brake, and the steering, for example.

In the following description, the vehicle provided with the vehicle control system 10 is referred to as "the subject vehicle," whereas another vehicle present around the subject vehicle is referred to as "another vehicle (other vehicles)."

In this example, the vehicle control system 10 includes a plurality of cameras 11, a plurality of radars 12, a position sensor 13, a vehicle status sensor 14, a driver status sensor 15, a driving operation sensor 16, a communication unit 17, a control unit 18, a human-machine interface 19, and an arithmetic unit 20. The arithmetic unit 20 is an example external environment recognition device.

[Camera (Imaging Unit)]

The cameras 11 have the same configuration. The cameras 11 each take an image of an external environment of a subject vehicle to acquire image data representing the external environment of the subject vehicle. The image data acquired by the cameras 11 is transmitted to the arithmetic unit 20. The cameras 11 are each an example imaging unit that takes an image of an external environment of a mobile object.

In this example, the cameras 11 are each a monocular camera having a wide-angle lens. The cameras 11 are disposed on the subject vehicle such that an imaging area of the external environment of the subject vehicle by the cameras 11 covers the entire circumference of the subject vehicle. The cameras 11 are each constituted by a solid imaging element such as a charge-coupled device (CCD) and a complementary metal-oxide-semiconductor (CMOS), for example. The cameras 11 may each be a monocular camera having a commonly used lens (e.g., a narrow-angle lens) or a stereo camera.

[Radar (Detection Unit)]

The radars 12 have the same configuration. The radars 12 each detect an external environment of the subject vehicle. Specifically, the radars 12 each transmit radio waves (example sensing waves) toward the external environment of the subject vehicle and receive reflected waves from the external environment of the subject vehicle to detect the external environment of the subject vehicle. Detection results from the radars 12 are transmitted to the arithmetic unit 20. The radars 12 are each an example detection unit that detects an external environment of the mobile object. The detection unit transmits the sensing waves toward the external environment of the mobile object and receives reflected waves from the external environment of the mobile object to detect the external environment of the mobile object.

In this example, the radars 12 are disposed on the subject vehicle such that a detecting area of the external environment of the subject vehicle by the radars 12 covers the entire circumference of the subject vehicle. The radars 12 may each be a millimeter-wave radar that transmits millimeter waves (example sensing waves), a lidar (light detection and ranging) that transmits laser light (example sensing waves), an infrared radar that transmits infrared rays (example sensing waves), or an ultrasonic radar that transmits ultrasonic waves (example sensing waves), for example.

[Position Sensor]

The position sensor 13 detects the position (e.g., the latitude and the longitude) of the subject vehicle. The position sensor 13 receives GPS information from the Global Positioning System and detects the position of the subject vehicle, based on the GPS information, for example. The position of the subject vehicle detected by the position sensor 13 is transmitted to the arithmetic unit 20.

[Vehicle Status Sensor]

The vehicle status sensor 14 detects the status (e.g., the speed, the acceleration, the yaw rate, and the like) of the subject vehicle. The vehicle status sensor 14 includes a vehicle speed sensor that detects the speed of the subject vehicle, an acceleration sensor that detects the acceleration of the subject vehicle, a yaw rate sensor that detects the yaw rate of the subject vehicle, and other sensors, for example. The status of the subject vehicle detected by the vehicle status sensor 14 is transmitted to the arithmetic unit 20.

[Driver Status Sensor]

The driver status sensor 15 detects the status (e.g., the health condition, the emotion, the body behavior, and the like) of a driver driving the subject vehicle. The driver status sensor 15 includes an in-vehicle camera that takes an image of the driver, a bio-information sensor that detects bio-information of the driver, and other sensors, for example.

The status of the driver detected by the driver status sensor 15 is transmitted to the arithmetic unit 20.

[Driving Operation Sensor]

The driving operation sensor 16 detects driving operations applied to the subject vehicle. The driving operation sensor 16 includes a steering angle sensor that detects a steering angle of the steering wheel of the subject vehicle, an acceleration sensor that detects an accelerator operation amount of the subject vehicle, a brake sensor that detects a brake operation amount of the subject vehicle, and other sensors, for example. The driving operations detected by the driving operation sensor 16 are transmitted to the arithmetic unit 20.

[Communication Unit]

The communication unit 17 communicates with an external device provided outside the subject vehicle. The communication unit 17 receives communication information from another vehicle (not shown) positioned around the subject vehicle, traffic information from a navigation system (not shown), and other information, for example. The information received by the communication unit 17 is transmitted to the arithmetic unit 20.

[Control Unit]

The control unit 18 is controlled by the arithmetic unit 20 to control the actuator 101 provided for the subject vehicle. The control unit 18 includes a powertrain device, a brake device, a steering device, and other devices, for example. The powertrain device controls the engine and transmission included in the actuator 101, based on a target driving force indicated by a driving command value, which will be described later. The brake device controls the brake included in the actuator 101, based on a target braking force indicated by a braking command value, which will be described later. The steering device controls the steering included in the actuator 101, based on a target steering amount indicated by a steering command value, which will be described later.

[Human-Machine Interface]

The human-machine interface 19 is for inputting/outputting information between the arithmetic unit 20 and an occupant (in particular, a driver) of the subject vehicle. The human-machine interface 19 includes a display that displays information, a speaker that outputs information as sound, a microphone that inputs sound, and an operation unit operated by an occupant (in particular, a driver) of the subject vehicle, and other units, for example. The operation unit is a touch panel or a button.

[Arithmetic Unit]

The arithmetic unit 20 determines a target route to be traveled by the subject vehicle and a target motion required for the subject vehicle to travel the target route, based on outputs from the sensors provided for the subject vehicle, the information transmitted from outside of the subject vehicle, and the like. The arithmetic unit 20 controls the control unit 18 to control the actuator 101 such that the motion of the subject vehicle matches the target motion. For example, the arithmetic unit 20 is an electronic control unit (ECU) having one or more arithmetic chips. In other words, the arithmetic unit 20 is an electronic control unit (ECU) having one or more processors, one or more memories storing programs and data for operating the one or more processors, and other units.

In this example, the arithmetic unit 20 includes an external environment recognition unit 21, a candidate route generation unit 22, a vehicle behavior recognition unit 23, a driver behavior recognition unit 24, a target motion determination unit 25, and a motion control unit 26. These units are some of the functions of the arithmetic unit 20.

The external environment recognition unit 21 recognizes an external environment of the subject vehicle. The candidate route generation unit 22 generates one or more candidate routes, based on the output from the external environment recognition unit 21. The candidate routes are routes which can be traveled by the subject vehicle, and also candidates for the target route.

The vehicle behavior recognition unit 23 recognizes the behavior (e.g., the speed, the acceleration, the yaw rate, and the like) of the subject vehicle, based on the output from the vehicle status sensor 14. For example, the vehicle behavior recognition unit 23 recognizes the behavior of the subject vehicle based on the output from the vehicle status sensor 14 using a learned model generated by deep learning. The driver behavior recognition unit 24 recognizes the behavior (e.g., the health condition, the emotion, the body behavior, and the like) of the driver, based on the output from the driver status sensor 15. For example, the driver behavior recognition unit 24 recognizes the behavior of the driver based on the output from the driver status sensor 15 using a learned model generated by deep learning.

The target motion determination unit 25 selects a candidate route as a target route from the one or more candidate routes generated by the candidate route generation unit 22, based on the output from the vehicle behavior recognition unit 23 and the output from the driver behavior recognition unit 24. For example, the target motion determination unit 25 selects a candidate route that the driver feels most comfortable with, out of the candidate routes. The target motion determination unit 25 then determines a target motion, based on the candidate route selected as the target route.

The motion control unit 26 controls a control unit 18, based on the target motion determined by the target motion determination unit 25. For example, the motion control unit 26 derives a target driving force, a target braking force, and a target steering amount, which are a driving force, a braking force, and a steering amount for achieving the target motion, respectively. The motion control unit 26 then transmits a driving command value representing the target driving force, a braking command value representing the target braking force, and a steering command value representing the target steering amount, to the powertrain device, the brake device, and the steering device included in the control unit 18, respectively.

[External Environment Recognition Unit]

Figure 2:
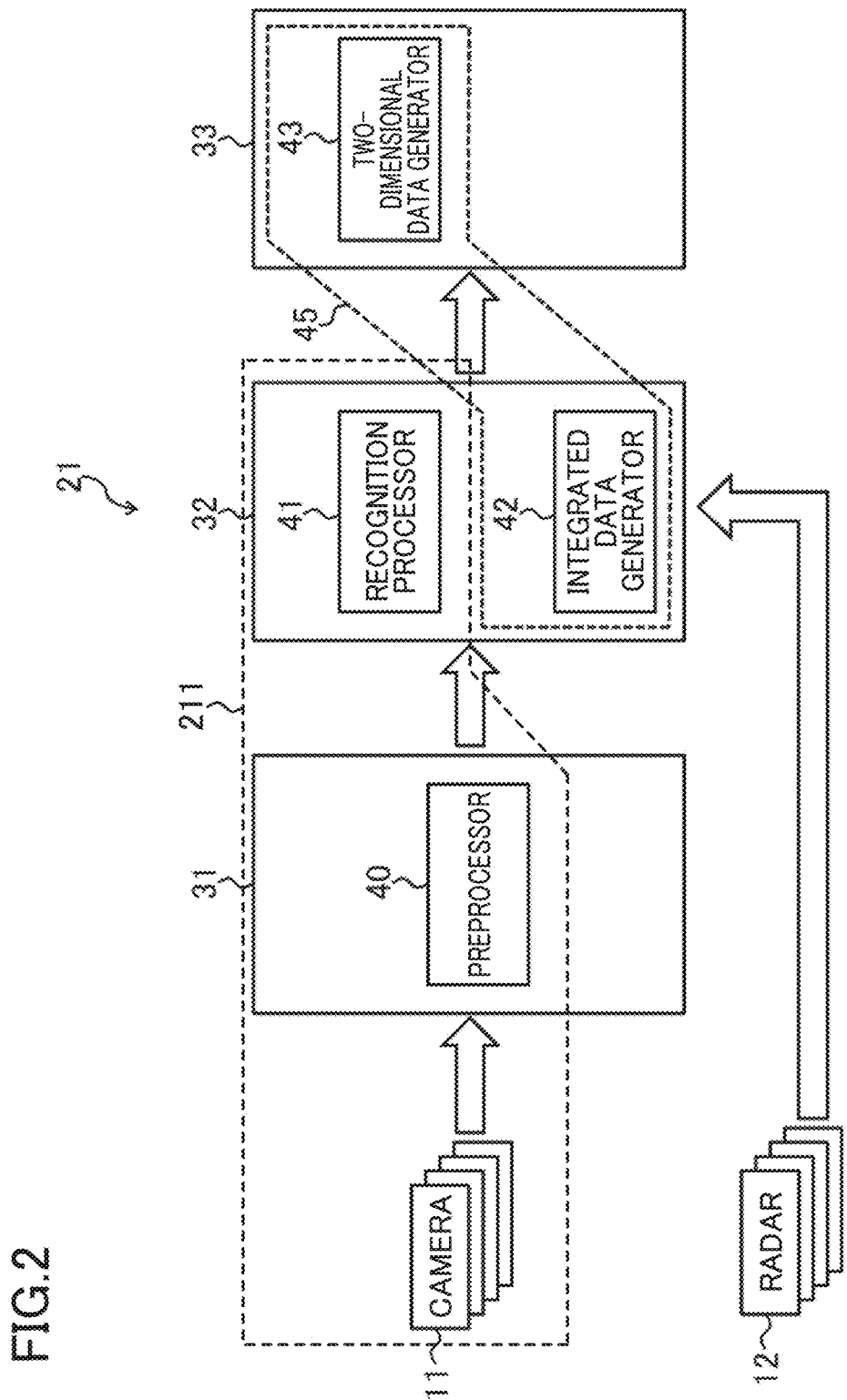
FIG. 2 is a block diagram illustrating a configuration of an external environment recognition unit.

FIG. 2 illustrates a configuration of the external environment recognition unit 21. In this example, the external environment recognition unit 21 includes an image processing chip 31, an artificial intelligence accelerator 32, and a control chip 33. The image processing chip 31, the artificial intelligence accelerator 32, and the control chip 33 each have a processor and a memory storing a program and data for operating the processor, for example.

In this example, the external environment recognition unit 21 includes a preprocessor 40, a recognition processor 41, an integrated data generator 42, and a two-dimensional data generator 43. These units are some of the functions of the external environment recognition unit 21. In this example, the image processing chip 31 is provided with the preprocessor 40; the artificial intelligence accelerator 32 is provided with the recognition processor 41 and the integrated data generator 42; and the control chip 33 is provided with the two-dimensional data generator 43.

<Preprocessor>

The preprocessor 40 performs preprocessing on the image data acquired by the cameras 11. The preprocessing includes distortion correction processing for correcting the distortion of an image represented in the image data, white balance adjustment processing for adjusting the brightness of the image represented in the image data, and the like.

<Recognition Processor>

The recognition processor 41 performs recognition processing. In the recognition processing, the recognition processor 41 recognizes an external environment of the subject vehicle, based on the image data that has been preprocessed by the preprocessor 40. In this example, the recognition processor 41 outputs a recognition result of the external environment of the subject vehicle, based on the external environment of the subject vehicle recognized based on the image data and detection results from the radars 12 (i.e., the external environment of the subject vehicle detected by the radars 12).

<Integrated Data Generator>

The integrated data generator 42 generates integrated data, based on the recognition result from the recognition processor 41. The integrated data is acquired by integrating data on the movable area and the target included in the external environment of the subject vehicle recognized by the recognition processor 41. In this example, the integrated data generator 42 generates integrated data, based on the recognition result from the recognition processor 41.

<Two-Dimensional Data Generator>

The two-dimensional data generator 43 generates two-dimensional data, based on the integrated data generated by the integrated data generator 42. The two-dimensional data is acquired by two-dimensionalizing data on the movable area and the target included in the integrated data.

<External Environment Data Generation Unit>

In this example, the integrated data generator 42 and the two-dimensional data generator 43 constitute the external environment data generation unit 45. The external environment data generation unit 45 generates external environment data (object data), based on the recognition result from the recognition processor 41. The external environment data represents the external environment of the subject vehicle recognized by the recognition processor 41. In this example, the external environment data generation unit 45 generates external environment data, based on the recognition result from the recognition processor 41.

[Configuration of Recognition Processor]

Figure 3:
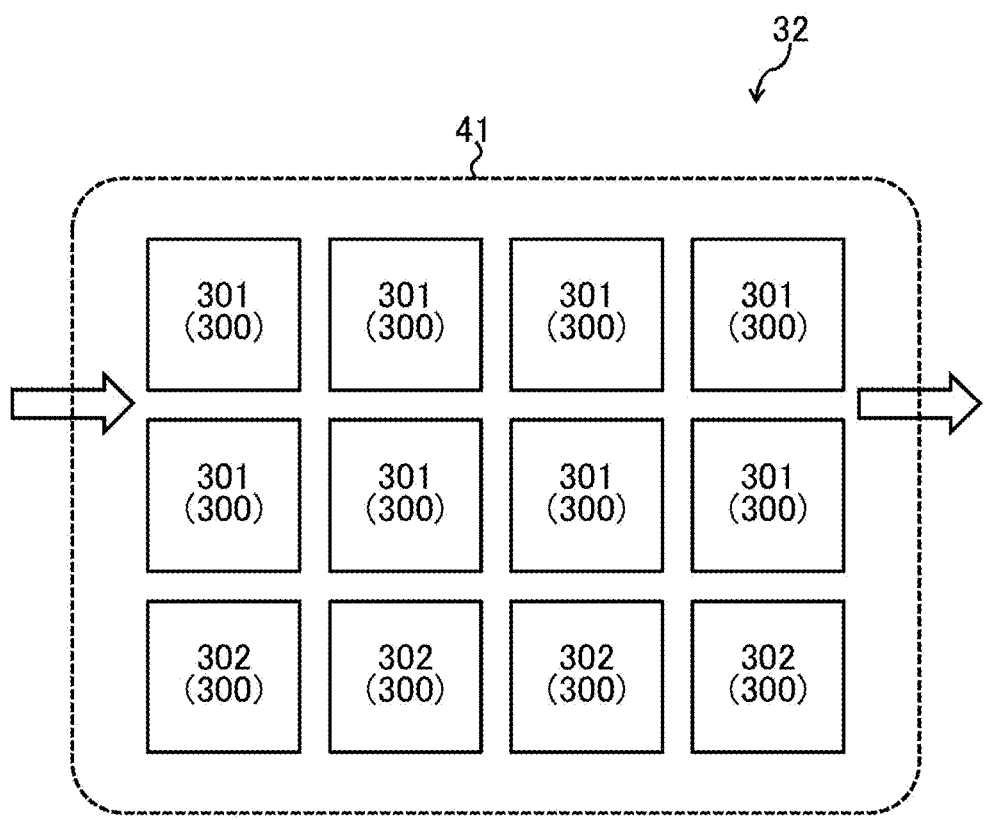
FIG. 3 is a block diagram illustrating a configuration of a recognition processor.

FIG. 3 illustrates a configuration of the recognition processor 41. The recognition processor 41 includes a plurality of arithmetic cores 300. The plurality of arithmetic cores 300 include recognition processing cores 301 and abnormality detection cores 302. In the example of FIG. 3, among twelve arithmetic cores 300, eight arithmetic cores 300 are recognition processing cores 301, and the remaining four arithmetic cores 300 are abnormality detection cores 302. For example, the arithmetic cores 300 each have a processor and a memory storing a program and data for operating the processor.

The recognition processing cores 301 perform recognition processing. In the recognition processing, the recognition processing cores 301 recognize an external environment of the subject vehicle, based on the image data that has been preprocessed by the preprocessor 40. In this example, the recognition processing cores 301 output a recognition result of the external environment of the subject vehicle, based on detection results from the radars 12 and the external environment of the subject vehicle recognized based on the image data.

The abnormality detection cores 302 detect the abnormality of the data processing system 211 including the cameras 11 and the recognition processor 41, based on the abnormality of the outputs from the recognition processing cores 301. In this example, the data processing system 211 including the cameras 11 and the recognition processor 41 ranges from the cameras 11 to the recognition processor 41 through the preprocessor 40. For example, the abnormality detection cores 302 may be configured to detect the abnormality of the outputs from the recognition processing cores 301 using a learned model generated by deep learning, in the abnormality detection processing for detecting the abnormality, of the data processing system 211. The learned model is for detecting the abnormality of the outputs from the recognition processing cores 301. The abnormality detection cores 302 may be configured to detect the abnormality of the outputs from the recognition processing cores 301 by using another known abnormality detection technique.

[Basic Operation of External Environment Recognition Unit]

Figure 4:
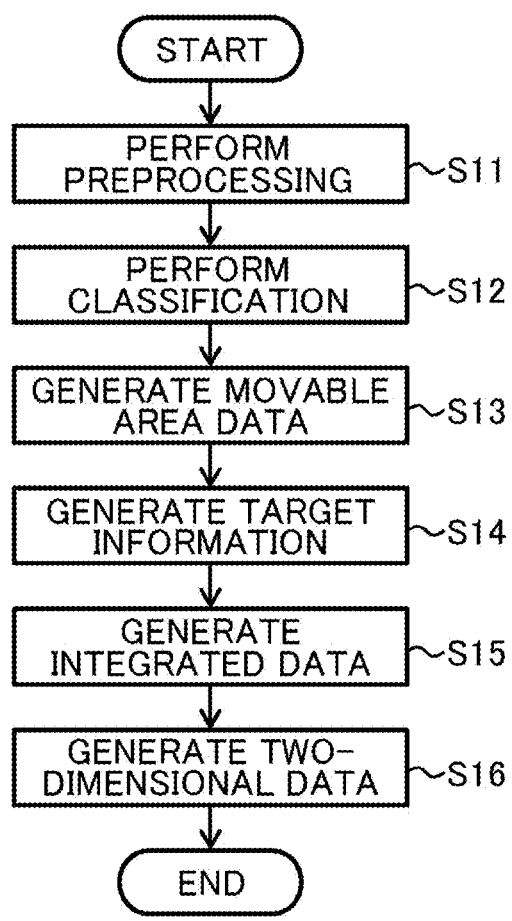
FIG. 4 is a flowchart illustrating a basic operation of the external environment recognition unit.

Next, a basic operation of the external environment recognition unit 21 will be described with reference to FIG. 4.

<Step S11>

First, the preprocessor 40 performs preprocessing on image data acquired by the cameras 11. In this example, the preprocessor 40 performs preprocessing on a plurality of pieces of image data acquired by a plurality of cameras 11. The preprocessing includes distortion correction processing for correcting the distortion of an image represented in the image data (the distortion due to the wider angles of view of the cameras 11 in this example), white balance adjustment processing for adjusting the white balance of the image represented in the image data, and the like. When there is no distortion in the image data acquired by the cameras 11 (e.g., when cameras having a normal lens are used), the distortion correction processing may be omitted.

Figure 5:
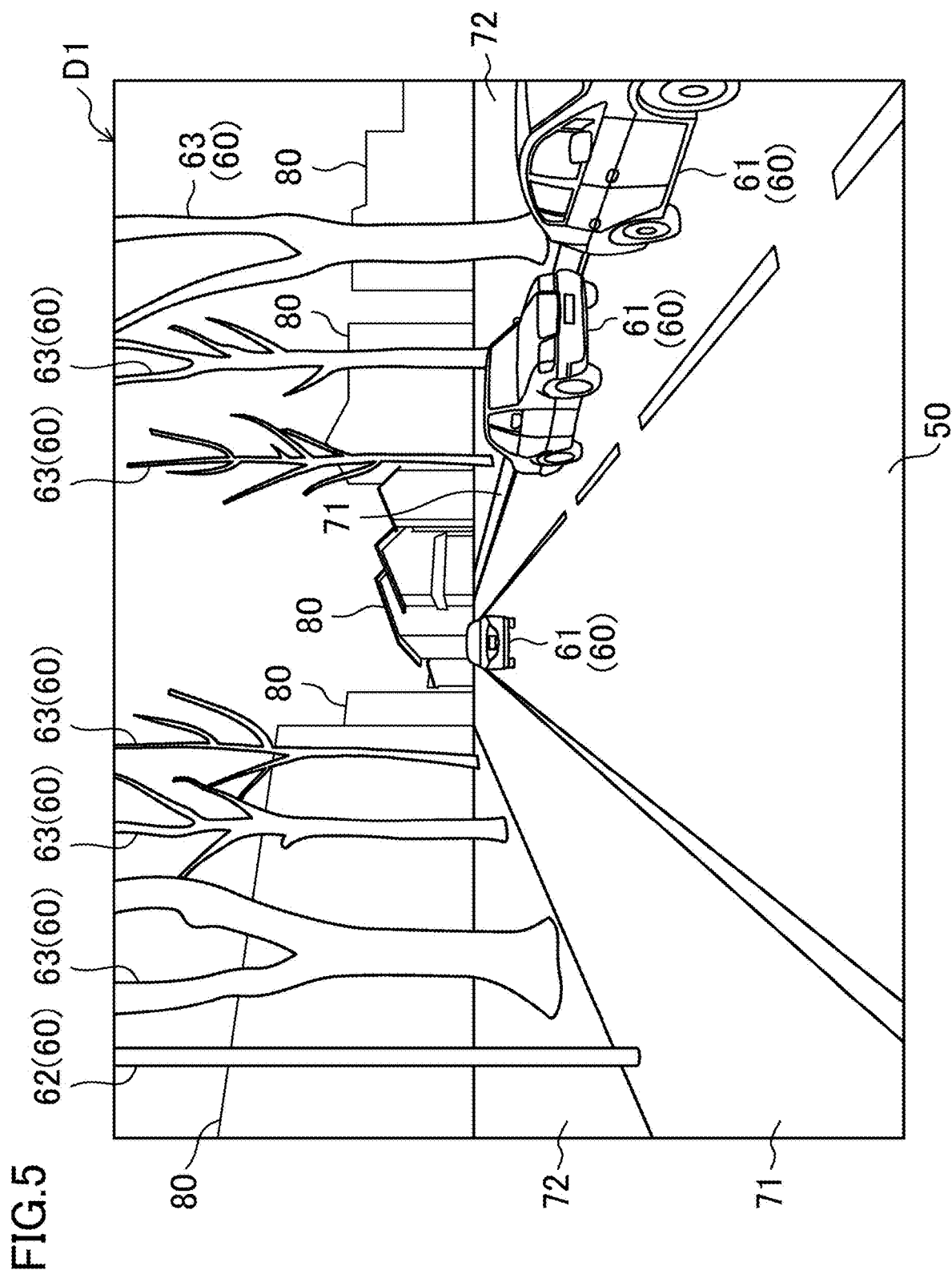
FIG. 5 illustrates image data.

As illustrated in FIG. 5, the external environment of the subject vehicle represented in the image data D1 includes a roadway 50, sidewalks 71, and empty lots 72. The roadway 50 is an example movable area in which the subject vehicle is movable. The external environment of the subject vehicle represented in the image data D1 also includes other vehicles 61, a sign 62, roadside trees 63, and buildings 80. The other vehicles (e.g., four-wheeled vehicles) 61 are example dynamic objects displaced over time. Other examples of the dynamic object include a motorcycle, a bicycle, a pedestrian, and other objects. The sign 62 and the roadside trees 63 are example stationary objects not displaced over time. Other examples of the stationary object include a median strip, a center pole, a building, and other objects. The dynamic and stationary objects are example targets 60.

In the example shown in FIG. 5, the sidewalks 71 are located on both sides of the roadway 50, and the empty lots 72 are located on the respective sides of the sidewalks 71 (at far ends from the roadway 50). In the example shown in FIG. 5, one of lanes of the roadway 50 is traveled by the subject vehicle and another vehicle 61, and the opposite lane of the roadway 50 is traveled by two other vehicles 61. The sign 62 and the roadside trees 63 are arranged along the outside of the sidewalks 71. The buildings 80 are located in positions far ahead of the subject vehicle.

<Step S12>

Next, the recognition processor 41 (recognition processing cores 301) performs classification processing on the image data D1. In this example, the recognition processor 41 performs classification processing on a plurality of pieces of image data acquired by a plurality of cameras 11. In the classification processing, the recognition processor 41 classifies the image represented in the image data D1 on a pixel-by-pixel basis, and adds classification information indicating the result of the classification to the image data D1. By this classification processing, the recognition processor 41 recognizes a movable area and targets in the image represented in the image data D1 (image representing the external environment of the subject vehicle). For example, the recognition processor 41 performs classification processing using a learned model generated by deep learning. The learned model is for classifying the image represented in the image data D1 on a pixel-by-pixel basis. The recognition processor 41 may be configured to perform classification processing by using another known classification technique.

Figure 6:
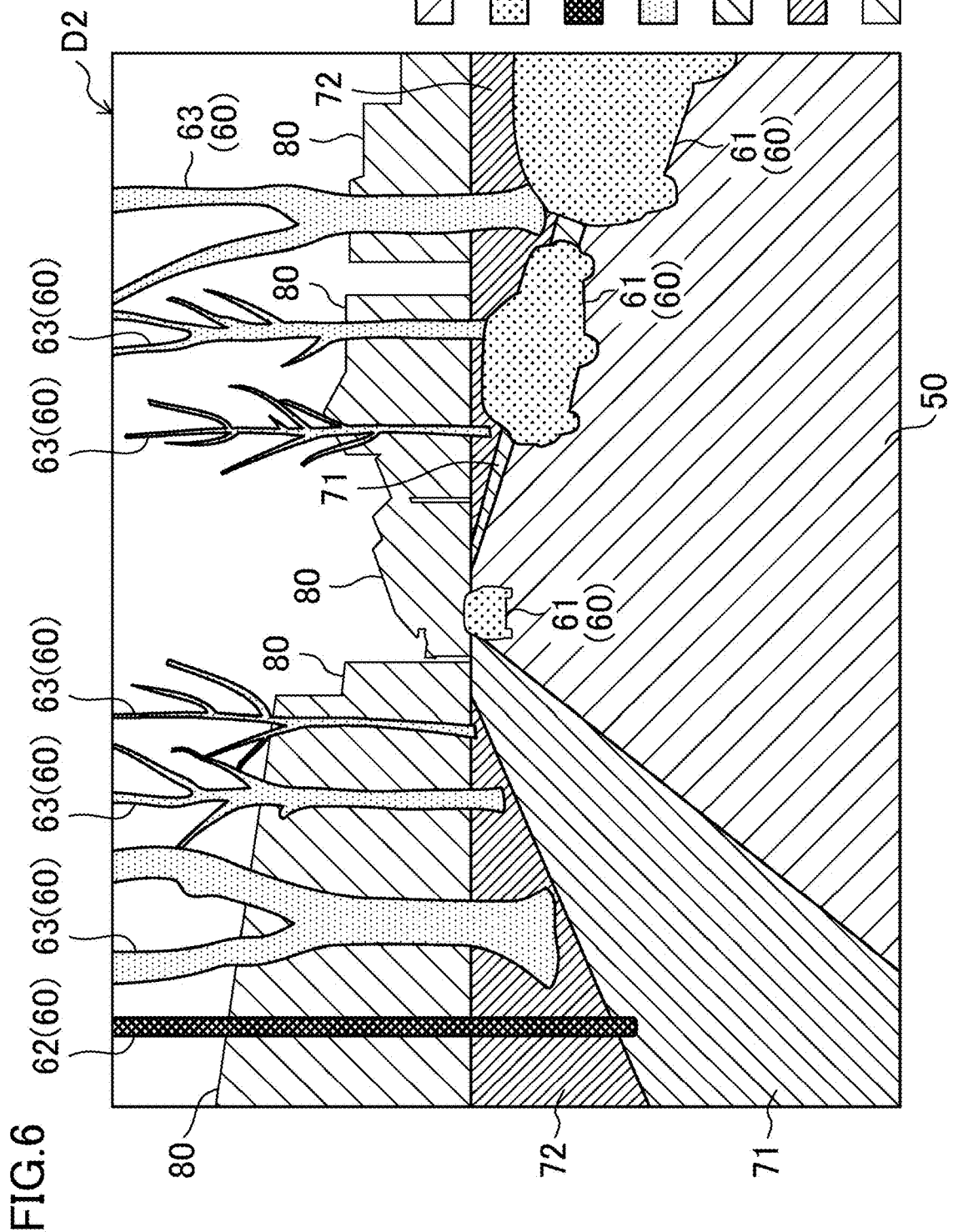
FIG. 6 illustrates a classification result of the image data.

FIG. 6 shows a segmented image D2 illustrating a classification result of the image represented in the image data D1. In the example of FIG. 6, the image represented in the image data D1 is classified into any of the roadway, the vehicle, the sign, the roadside tree, the sidewalk, the empty lot, and the building on a pixel-by-pixel basis.

<Step S13>

Next, the recognition processor 41 (recognition processing cores 301) performs movable area data generation processing on the image data. In the movable area data generation processing, the recognition processor 41 specifies a pixel region classified as a movable area (the roadway 50 in this example) by the classification processing, from the image represented in the image data D1, and generates movable area data, based on the specified pixel region. The movable area data is data (three-dimensional map data in this example) representing a movable area recognized by the recognition processor 41. In this example, the recognition processor 41 generates movable area data, based on a movable area specified in each of the plurality of pieces of image data acquired by the cameras 11 at the same time point. For example, a known three-dimensional data generation technique may be used for the known three-dimensional data generation technique.

<Step S14>

The recognition processor 41 (recognition processing cores 301) further performs target information generation processing. In the target information generation processing, the recognition processor 41 performs first information generation processing, second information generation processing, and information integration processing.

The first information generation processing is performed on the image data. In this example, the recognition processor 41 performs first information generation processing on a plurality of pieces of image data acquired from a plurality of cameras 11. In the first information generation processing, the recognition processor 41 specifies pixel region classified as a target 60 by the classification processing, form the image represented in the image data D1, and generates target information based on the specified pixel region. When a plurality of targets 60 are recognized from the image represented in the image data D1, the recognition processor 41 performs first information generation processing on each of the targets 60. The target information is information on the target 60, and indicates the kind and shape of the target 60, the distance and direction from the subject vehicle to the target 60, the position of the target 60 relative to the subject vehicle, the magnitude and direction of the relative speed of the target 60 relative to the moving speed of the subject vehicle, and the like. For example, the recognition processor 41 performs first information generation processing using a learned model generated by deep learning. This learned model is for generating target information, based on the pixel region (a pixel region classified as a target 60) specified from the image represented in the image data D1. The recognition processor 41 may be configured to perform first information generation processing using another known information generation technique (target detection technique).

The second information generation processing is performed on outputs from the radars 12. In this example, the recognition processor 41 performs the second information generation processing based on the outputs from a plurality of radars 12. In the second information generation processing, the recognition processor 41 generates target information, based on the detection results from the radars 12. For example, the recognition processor 41 performs analysis processing on the detection results from the radars 12 (the intensity distribution of reflected waves representing the external environment of the subject vehicle), to derive target information (the kind and shape of the target 60, the distance and direction from the subject vehicle to the target 60, the position of the target 60 relative to the subject vehicle, the magnitude and direction of the relative speed of the target 60 relative to the moving speed of the subject vehicle, and the like). The recognition processor 41 may be configured to perform second information generation processing using a learned model generated by deep learning (a learned model for generating target information, based on the detection results from the radars 12), or to perform second information generation processing using another known analysis technique (target detection technique).

In the information integration processing, the recognition processor 41 integrates target information obtained by first information generation processing and target information obtained by second information generation processing, to generate new target information. For example, for each of the parameters (specifically, the kind and shape of the target 60, the distance and direction from the subject vehicle to the target 60, the position of the target 60 relative to the subject vehicle, the magnitude and direction of the relative speed of the target 60 relative to the moving speed of the subject vehicle, and the like) included in the target information, the recognition processor 41 compares the parameter of the target information acquired by the first information generation processing with the parameter of the target information acquired by the second information generation processing, and determines the parameter with higher accuracy between the two parameters as the parameter included in new target information.

<Step S15>

Next, the integrated data generator 42 integrates the movable area data generated in the Step S13 and the target information generated in the step S14 to generate integrated data D3. The integrated data D3 is data (the three-dimensional map data in this example) generated by integrating data on the movable area (the roadway 50 in this example) and data on the target 60 recognized by the recognition processor 41 (recognition processing cores 301). For example, the integrated data generator 42 may be configured to generate integrated data D3 from the movable area data and the target information by using a known data integration technique.

Figure 7:
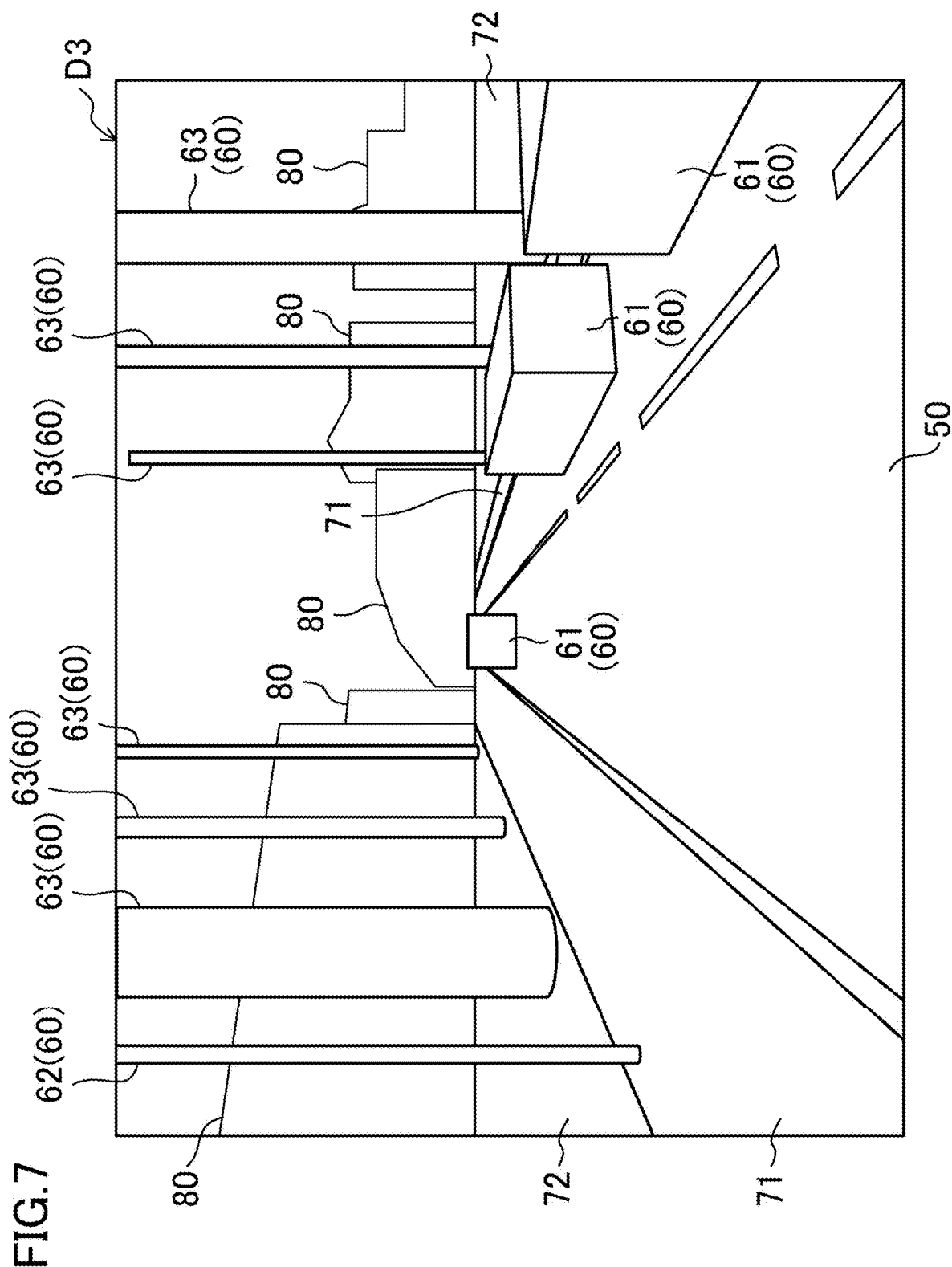
FIG. 7 illustrates a concept of integrated data.

FIG. 7 illustrates a concept of the integrated data D3. As illustrated in FIG. 7, the targets 60 are abstracted in the integrated data D3.

<Step S16>

Next, the two-dimensional data generator 43 generates two-dimensional data D4 by two-dimensionalizing the integrated data D3. The two-dimensional data D4 is two-dimensional data (the two-dimensional map data in this example) on the movable area (the roadway 50 in this example) and the targets 60 included in the integrated data D3. For example, the two-dimensional data generator 43 may be configured to generate the two-dimensional data D4 from the integrated data D3 by using a known two-dimensional data generation technique.

Figure 8:
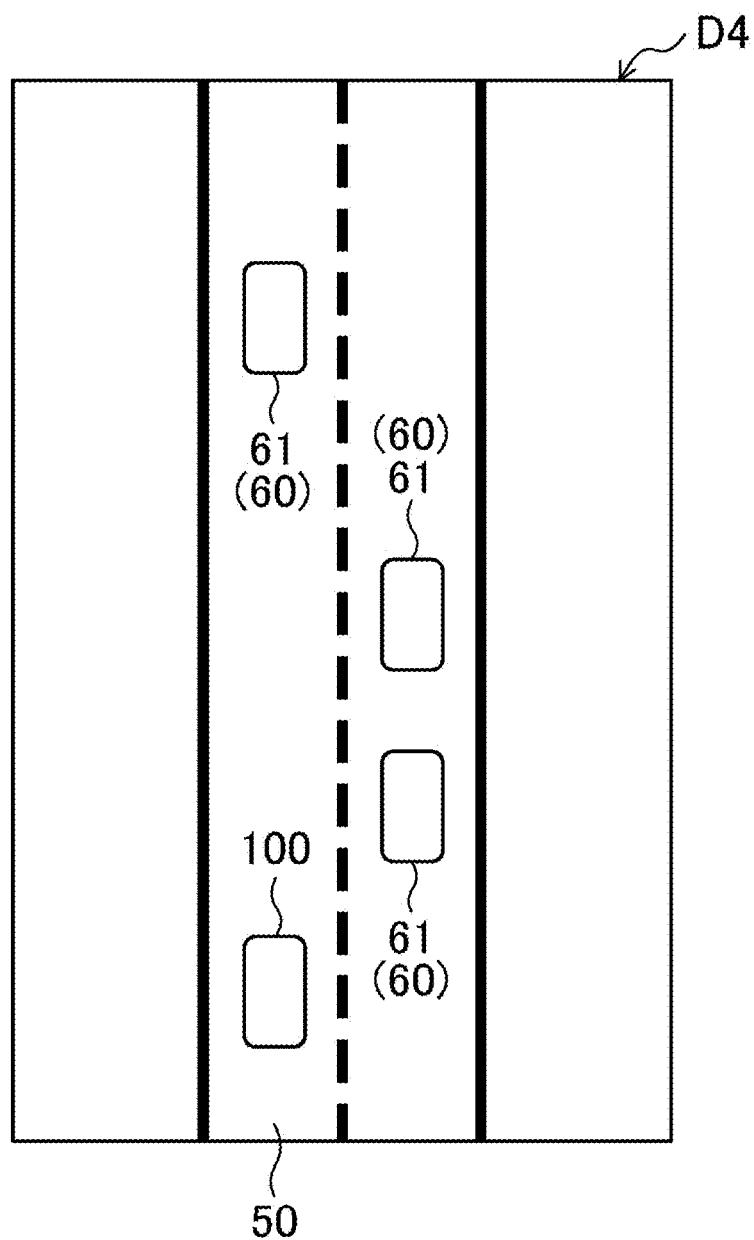
FIG. 8 illustrates two-dimensional data.

As illustrated in FIG. 8, in the two-dimensional data D4, the movable area (the roadway 50 in this example) and the target 60 (the subject vehicle 100 in this example) are made two-dimensional. In this example, the two-dimensional data D4 corresponds to a bird's-eye view of the subject vehicle 100 (a view looking down the subject vehicle 100 from above). The two-dimensional data D4 includes data on the roadway 50, other vehicles 61, and the subject vehicle 100.

As can be seen, in this example, the recognition processing performed by the recognition processor 41 (specifically, the recognition processing cores 301) includes classification processing, movable area data generation processing, and target information generation processing. The outputs from the recognition processing cores 301 represent the external environment (the movable area, the targets 60, and the like) of the subject vehicle recognized by the recognition processing.

[Abnormality Detection Processing]

Figure 9:
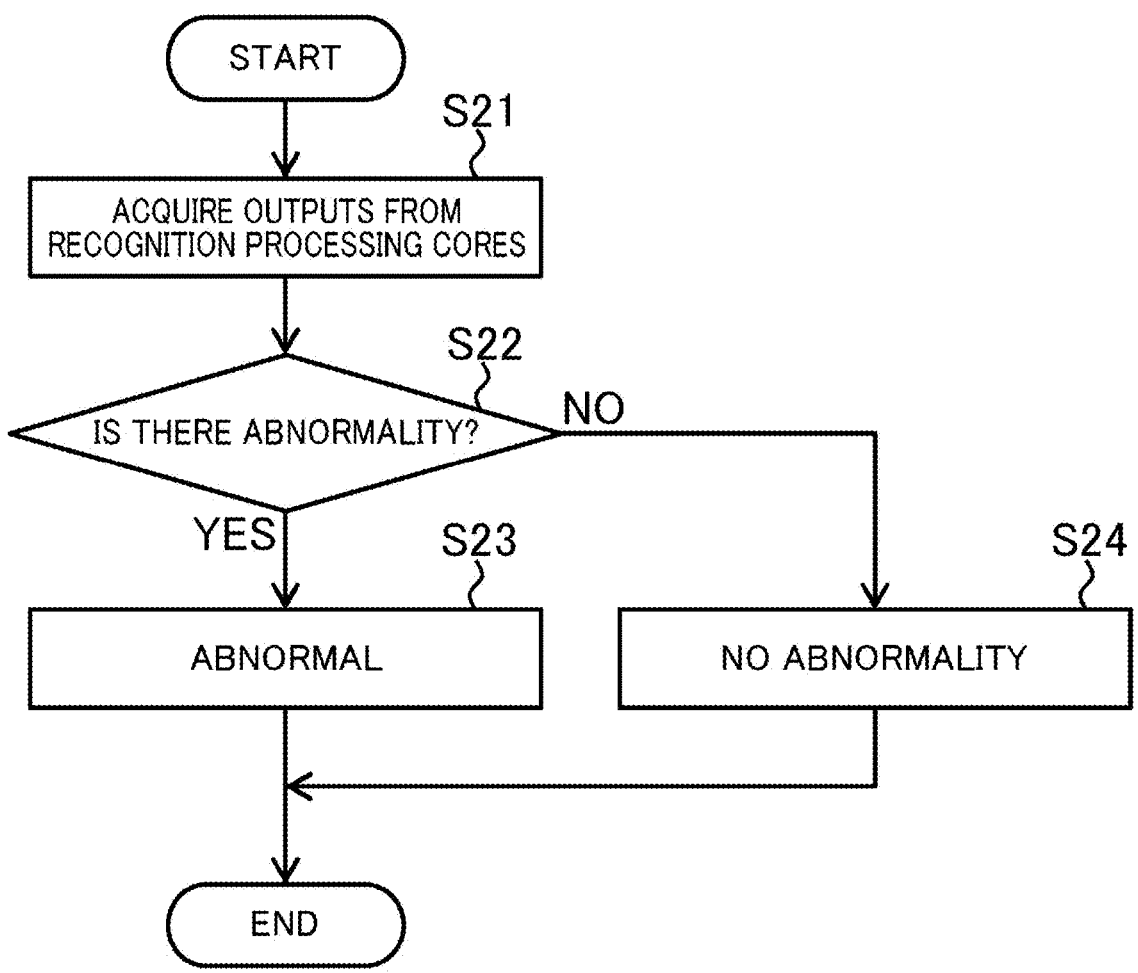
FIG. 9 is a flowchart illustrating an abnormality detection operation of an abnormality detection core.

Next, the abnormality detection processing (the processing to detect the abnormality of the data processing system) by the abnormality detection cores 302 will be described with reference to FIG. 9.

<Step S21>

First, the abnormality detection cores 302 acquire outputs from the recognition processing cores 301. The outputs from the recognition processing cores 301 represent the external environment of the subject vehicle recognized by the recognition processing.

<Step S22>

Next, the abnormality detection cores 302 determine whether or not the outputs from the recognition processing cores 301 have an abnormality. If the outputs from the recognition processing cores 301 have the abnormality, the Step S23 is performed, and if not, the Step S24 is performed.

<Step S23>

If the outputs from the recognition processing cores 301 have the abnormality, the abnormality detection cores 302 determine that the data processing system including the cameras 11 and the recognition processor 41 has the abnormality.

<Step S24>

If the outputs from the recognition processing cores 301 have no abnormality, the abnormality detection cores 302 determine that the data processing system including the cameras 11 and the recognition processor 41 has no abnormality.

[Specific Examples of Abnormality of Output from Recognition Processing Cores 301]

Next, the abnormality of the outputs from the recognition processing cores 301 will be described. In this example, the abnormality of the outputs from the recognition processing cores 301 include a static abnormality of the outputs from the recognition processing cores 301 and an abnormality of the temporal change in the outputs from the recognition processing cores 301 (dynamic abnormality). Specifically, in this example, the abnormality detection cores 302 determine that the data processing system has the abnormality if the outputs from the recognition processing cores 301 have at least one of the static abnormality or the abnormality of the temporal change, and determines that the data processing system has no abnormality if the outputs from the recognition processing cores 301 have neither the static abnormality nor the abnormality of the temporal change.

<Static Abnormality of Output from Recognition Processing Cores 301>

The static abnormality of the outputs from the recognition processing cores 301 is detected based on the outputs from the recognition processing cores 301, generated based on the image data acquired at a single time point. Examples of the static abnormality of the outputs from the recognition processing cores 301 include an abnormality of the data amount of the outputs from the recognition processing cores 301, an abnormality of the external environment of the subject vehicle represented in the outputs from the recognition processing cores 301, and other abnormalities.

In the abnormality detection processing (the processing to detect the abnormality of the data processing system) based on the abnormality of the data amount of the outputs from the recognition processing cores 301, the abnormality detection cores 302 determine that the data processing system has the abnormality if the data amount of the outputs from the recognition processing cores 301 deviate from the predetermined normal range, and determine that the data processing system has no abnormality if the data amount of the outputs from the recognition processing cores 301 does not deviate from the normal range.

In the abnormality detection processing based on the abnormality of the external environment of the subject vehicle represented in the outputs from the recognition processing cores 301 (i.e., the external environment of the subject vehicle recognized by the recognition processing), the abnormality detection cores 302 determine that the data processing system has the abnormality if the external environment of the subject vehicle represented in the outputs from the recognition processing cores 301 is unrealistic, and determine that the data processing system has no abnormality if it is realistic. Examples of the unrealistic external environment of the subject vehicle represented in the outputs from the recognition processing cores 301 include the case in which the position and/or shape of the roadway 50 included in the external environment of the subject vehicle represented in the outputs from the recognition processing cores 301 is unrealistic, the case in which the position and/or shape of the target 60 included in the external environment of the subject vehicle represented in the outputs from the recognition processing cores 301 is unrealistic, the case in which the positions and/or shapes of the roadway 50 and the target 60 included in the external environment of the subject vehicle represented in the outputs from the recognition processing cores 301 is realistic, and other cases. Specific examples thereof include the case in which the width of the roadway 50 deviates from the predetermined roadway width range (e.g., the range from the conceivable minimum width to the conceivable maximum width of the roadway 50), the case in which the widths of other vehicles 61, which are examples of the targets 60, deviate from the predetermined width range (e.g., the range from the conceivable minimum width to the conceivable maximum width of the other vehicles 61), and other cases.

<Abnormality of Temporal Change in Output from Recognition Processing Cores 301>

The abnormality of the temporal change in the outputs from the recognition processing cores 301 is detected based on the outputs from the plurality of recognition processing cores 301, generated based on a plurality of pieces of image data acquired at different time points. Examples of the abnormality of the temporal change in the outputs from the recognition processing cores 301 include an abnormality of the temporal change in the data amount of the outputs from the recognition processing cores 301, an abnormality of the temporal change in the external environment of the subject vehicle represented in the outputs from the recognition processing cores 301, and other abnormalities.

In the abnormality detection processing (the processing to detect the abnormality of the data processing system) based on the abnormality of the temporal change in the data amount of the outputs from the recognition processing cores 301, the abnormality detection cores 302 determine that the data processing system has the abnormality if the temporal change in the data amount of the outputs from the recognition processing cores 301 deviates from the predetermined normal change range, and determine that the data processing system has no abnormality if the temporal change in the data amount of the outputs from the recognition processing cores 301 does not deviate from the normal change range.

In the abnormality detection processing based on the abnormality of the temporal change in the external environment of the subject vehicle represented in the outputs from the recognition processing cores 301, the abnormality detection cores 302 determine that the data processing system has the abnormality if the temporal change in the external environment of the subject vehicle represented in the outputs from the recognition processing core 301 is unrealistic, and determine that the data processing system has no abnormality if it is realistic. Examples of the unrealistic temporal change in the external environment of the subject vehicle represented in the outputs from the recognition processing cores 301 include the case in which the temporal change in the position and/or shape of the roadway 50 (movable area) included in the external environment of the subject vehicle represented in the outputs from the recognition processing cores 301 is unrealistic, the case in which temporal change in the position and/or shape of the target 60 included in the external environment of the subject vehicle represented in the outputs from the recognition processing cores 301 is unrealistic, the case in which the temporal changes in the positions and/or shapes of the roadway 50 and the target 60 included in the external environment of the subject vehicle represented in the outputs from the recognition processing cores 301 are unrealistic, and other cases. Specific examples thereof includes the case in which the amount of temporal change in the width of the roadway 50 exceeds the predetermined upper limit of the amount of change in the roadway width (e.g., the conceivable upper limit of the amount of temporal change in the width of the roadway 50), the case in which the amounts of temporal changes in the widths of other vehicles 61, which are examples of the targets 60, exceed the predetermined upper limit of the amount of temporal change in the vehicle width (e.g., the conceivable upper limit of the amount of temporal change in the widths of other vehicles 61), the case in which the targets 60 such as other vehicles 61 and the sign 62 suddenly disappear and cannot be tracked, and other cases.

Advantages of Embodiment

As described above, the arithmetic unit 20 of this embodiment allows the abnormality of the data processing system targeted for abnormality detection to be detected without providing the entire data processing system with redundancy. This reduces the increase in circuit size and power consumption due to addition of an abnormality detection function compared with the case in which the entire data processing system targeted for abnormality detection is provided with redundancy.

Further, in the arithmetic unit 20 of this embodiment, the abnormality detection cores 302 detect the abnormality of the data processing system, based on the abnormality of the temporal change in the outputs from the recognition processing cores 301. In this manner, the detection based on the abnormality of the temporal change in the outputs from the recognition processing cores 301 allows detection of an abnormality undetectable from the outputs at a single time point from the recognition processing core 301. This enables improvement in accuracy of the abnormality detection for the data processing system.

First Variation of Embodiment

The abnormality of the outputs from the recognition processing cores 301 is preferably an abnormality of the movable area included in the external environment of the vehicle (i.e., the external environment of the vehicle recognized by the recognition processing) represented in the outputs from the recognition processing cores 301. In the first variation, the abnormality detection cores 302 detect the abnormality of the data processing system, based on the abnormality of the movable area included in the external environment of the vehicle represented in the outputs from the recognition processing cores 301.

Advantages of First Variation of Embodiment

In the arithmetic unit 20 of the first variation of this embodiment, the abnormality detection cores 302 detect the abnormality of the data processing system, based on the abnormality of the movable area recognized by the recognition processing. In the image (image data) representing the external environment of the vehicle, an area of a pixel region representing the movable area (e.g., the roadway 50) tends to be greater than those of the pixel regions representing the targets 60 (e.g., the vehicles 61). Thus, in the recognition processing, the movable area is easier to be recognized than the targets. The detection of the abnormality of the data processing system, based on the abnormality of the movable area recognized by the recognition processing allows improvement in accuracy of detecting the abnormality of the data processing system, compared with the case of the detection of the abnormality of the data processing system, based on abnormalities of the targets recognized by the recognition processing.

Second Variation of Embodiment

The abnormality detection cores 302 each may be configured to detect the abnormality of the data processing system, based on the duration of the abnormality of the outputs from the recognition processing cores 301. Specifically, in the second variation, the abnormality detection cores 302 determine that the data processing system has the abnormality if the duration of the abnormality in the outputs from the recognition processing cores 301 exceeds the predetermined normal time, and determine that the data processing system has no abnormality if the duration of the abnormality in the outputs from the recognition processing cores 301 does not exceed the normal time. Also in the second variation, the abnormality of the outputs from the recognition processing cores 301 may include the static abnormality of the outputs from the recognition processing cores 301 and the abnormality of the temporal change in the outputs from the recognition processing cores 301 (dynamic abnormality).

Advantages of Second Variation of Embodiment

Further, in the arithmetic unit 20 of the second variation of this embodiment, the abnormality detection cores 302 detect the abnormality of the data processing system, based on the duration of the abnormality of the outputs from the recognition processing cores 301. This enables a reduction in excessive detection of the abnormality of the data processing system. For example, it is possible to avoid the situation in which the abnormality of the data processing system is erroneously detected when the outputs from the recognition processing cores 301 have an abnormality for a short period of time due to another cause (e.g., instantaneous noise and the like) which is not the abnormality of the data processing system. This enables an appropriate detection of the abnormality of the data processing system.

Third Variation of Embodiment

Some or all of the arithmetic cores 300 may be configured to be switched between the recognition processing core 301 and the abnormality detection core 302. For example, as illustrated in FIG. 3, if all of the twelve arithmetic cores 300 arranged in a matrix of three rows and four columns can be switched between the recognition processing core 301 and the abnormality detection core 302, the arithmetic cores 300 may be periodically switched among the first state in which the arithmetic cores 300 in the first row are abnormality detection cores 302, and the remaining arithmetic cores 300 are recognition processing cores 301, the second state in which the arithmetic cores 300 in the second row are abnormality detection cores 302, and the remaining arithmetic cores 300 are recognition processing cores 301, and the third state in which the arithmetic cores 300 in the third row are abnormality detection cores 302, and the remaining arithmetic cores 300 are recognition processing cores 301.

Advantages of Third Variation of Embodiment

In the arithmetic unit 20 of the third variation of this embodiment, some or all of the arithmetic cores 300 are configured to be switched between the recognition processing core 301 and the abnormality detection core 302. With this configuration, the arithmetic cores 300 serving as abnormality detection cores 302 to perform abnormality detection processing can be switched to the recognition processing cores 301 targeted for the abnormality detection processing. This allows an increase in the number of arithmetic cores 300 targeted for the abnormality detection processing.

Specific Structure of Arithmetic Unit

Figure 10:
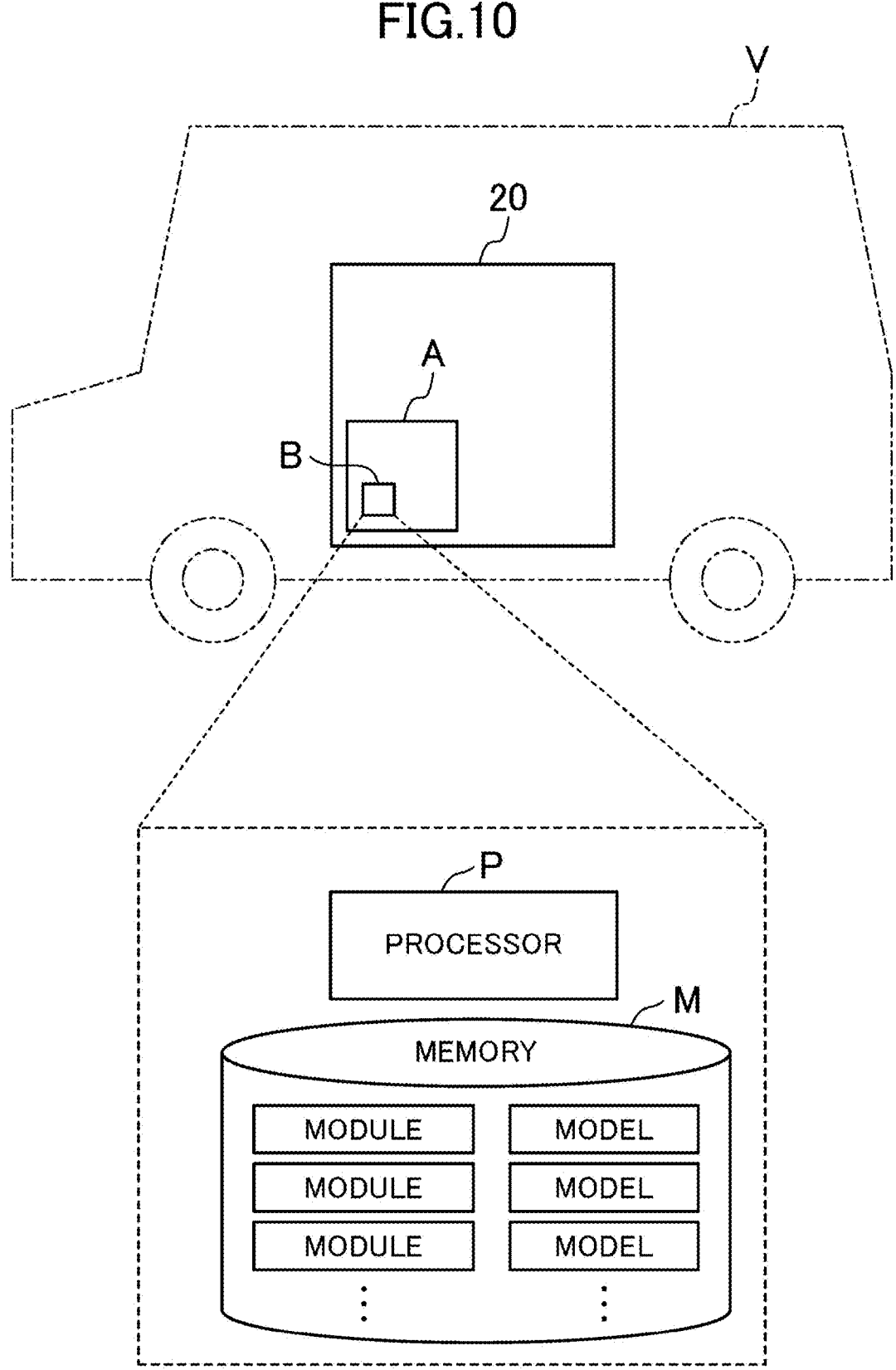
FIG. 10 illustrates a specific structure of an arithmetic unit.

FIG. 10 illustrates a specific structure of the arithmetic unit 20. The arithmetic unit 20 is provided for a vehicle V. The arithmetic unit 20 includes one or more electronic control units (ECUs). The electronic control units each include one or more chips A. The chips A each have one or more cores B. The cores B each include a processor P and a memory M. That is, the arithmetic unit 20 includes one or more processors P and one or more memories M. The memories M each store a program and information for operating the processor P. Specifically, the memories M each store modules each of which is a software program executable by the processor P and data representing models to be used in processing by the processor P, for example. The functions of the units of the arithmetic unit 20 are achieved by the processor P executing the modules stored in the memories M.

Other Embodiments

The above description provides an example of the vehicle (four-wheeled vehicle) as a mobile object, but this is not limiting. For example, the mobile object may be a ship, a train, an aircraft, a motorcycle, an autonomous mobile robot, a vacuum cleaner, a drone, or the like.

Further, the above description provides an example of providing the two-dimensional data generator 43 for a control chip 33, but this is not limiting. For example, the two-dimensional data generator 43 may be provided for an artificial intelligence accelerator 32 or any other arithmetic chip. The same applies to other configurations (e.g., the preprocessor 40 and other units) of the external environment recognition unit 21 and other configurations (e.g., the candidate route generation unit 22 and other units) of the arithmetic unit 20.

Further, the above description provides an example configuration in which the external environment recognition unit 21 has an image processing chip 31, an artificial intelligence accelerator 32, and a control chip 33, but this is not limiting. For example, the external environment recognition unit 21 may have two or less arithmetic chips or four or more arithmetic chips. The same applies to other configurations (e.g., the preprocessor 40 and other units) of the external environment recognition unit 21 and other configurations (e.g., the candidate route generation unit 22 and other units) of the arithmetic unit 20.

The foregoing embodiment and variations thereof may be implemented in combination as appropriate. The foregoing embodiment and variations thereof are merely beneficial examples in nature, and are not intended to limit the scope, applications, or use of the present disclosure.

INDUSTRIAL APPLICABILITY

As can be seen from the foregoing description, the technology disclosed herein is useful as an external environment recognition device that recognizes an external environment of a mobile object.

DESCRIPTION OF REFERENCE CHARACTERS

10 Vehicle Control System (Mobile Object Control System)
11 Camera (Imaging Unit)
12 Radar (Detection Unit)
13 Position Sensor
14 Vehicle Status Sensor
15 Driver Status Sensor
16 Driving Operation Sensor
17 Communication Unit
18 Control Unit
19 Human-Machine Interface
20 Arithmetic Unit
21 External Environment Recognition Unit
22 Candidate Route Generation Unit
23 Vehicle Behavior Recognition Unit
24 Driver Behavior Recognition Unit
25 Target Motion Determination Unit
26 Motion Control Unit
31 Image Processing Chip
32 Artificial Intelligence Accelerator 33 Control Chip
40 Preprocessor
41 Recognition Processor
42 Integrated Data Generator
43 Two-dimensional Data Generator
45 External Environment Data Generation Unit
50 Roadway (Movable Area)
60 Target
61 Another Vehicle
62 Sign
63 Roadside Tree
71 Sidewalk
72 Empty Lot
80 Building
100 Vehicle (Mobile Object)
101 Actuator
300 Arithmetic Core
301 Recognition Processing Core
302 Abnormality Detection Core

The invention claimed is:

1. An external environment recognition device that recognizes an external environment of a mobile object, the external environment recognition device comprising:
a recognition processor that performs recognition processing to recognize the external environment of the mobile object, based on image data acquired by an imaging unit that takes an image of the external environment of the mobile object, wherein
the recognition processor includes a plurality of arithmetic cores,
the plurality of arithmetic cores include:
a recognition processing core that performs the recognition processing, and
an abnormality detection core that detects an abnormality of a data processing system that includes the imaging unit and the recognition processor, based on an abnormality of an output from the recognition processing core, and
the abnormality of the output from the recognition processing core includes at least one of:
an abnormality of a data amount of the output from the recognition processing core,
an abnormality of the external environment of the mobile object represented in the output from the recognition processing core,
an abnormality of a temporal change in the data amount of the output from the recognition processing core, or
an abnormality of the temporal change in the external environment of the mobile object represented in the output from the recognition processing core,
wherein the abnormality of the output from the recognition processing core further comprises an abnormality that persists for more than a predetermined time and comprises:
a first abnormality of a dimension of a stationary object that is included in the recognized external environment and that does not correspond to a stored dimension of the stationary object, and
a second abnormality of a dimension of another mobile object that is moving and is included in the recognized external environment and that does not correspond to a stored dimension of the another mobile object.

2. A method performed by external environment recognition device that recognizes an external environment of a mobile object, the method comprising:
performing recognition processing to recognize the external environment of the mobile object, based on image data acquired by an imaging unit that takes an image of the external environment of the mobile object, wherein
the recognition processing is performed by a recognition processor that includes a plurality of arithmetic cores,
the plurality of arithmetic cores include:
a recognition processing core that performs the recognition processing, and
an abnormality detection core that detects an abnormality of a data processing system that includes the imaging unit and the recognition processor, based on an abnormality of an output from the recognition processing core, and
the abnormality of the output from the recognition processing core includes at least one of:
an abnormality of a data amount of the output from the recognition processing core,
an abnormality of the external environment of the mobile object represented in the output from the recognition processing core,
an abnormality of a temporal change in the data amount of the output from the recognition processing core, or
an abnormality of the temporal change in the external environment of the mobile object represented in the output from the recognition processing core,
wherein the abnormality of the output from the recognition processing core further comprises an abnormality that persists for more than a predetermined time and comprises:
a first abnormality of a dimension of a stationary object that is included in the recognized external environment and that does not correspond to a stored dimension of the stationary object, and
a second abnormality of a dimension of another mobile object that is moving and is included in the recognized external environment and that does not correspond to a stored dimension of the another mobile object.

* * * * *